Jan. 24, 1933.   O. M. DEAN   1,895,025
PROCESS OF CUTTING FUR
Filed Oct. 22, 1930   3 Sheets-Sheet 1
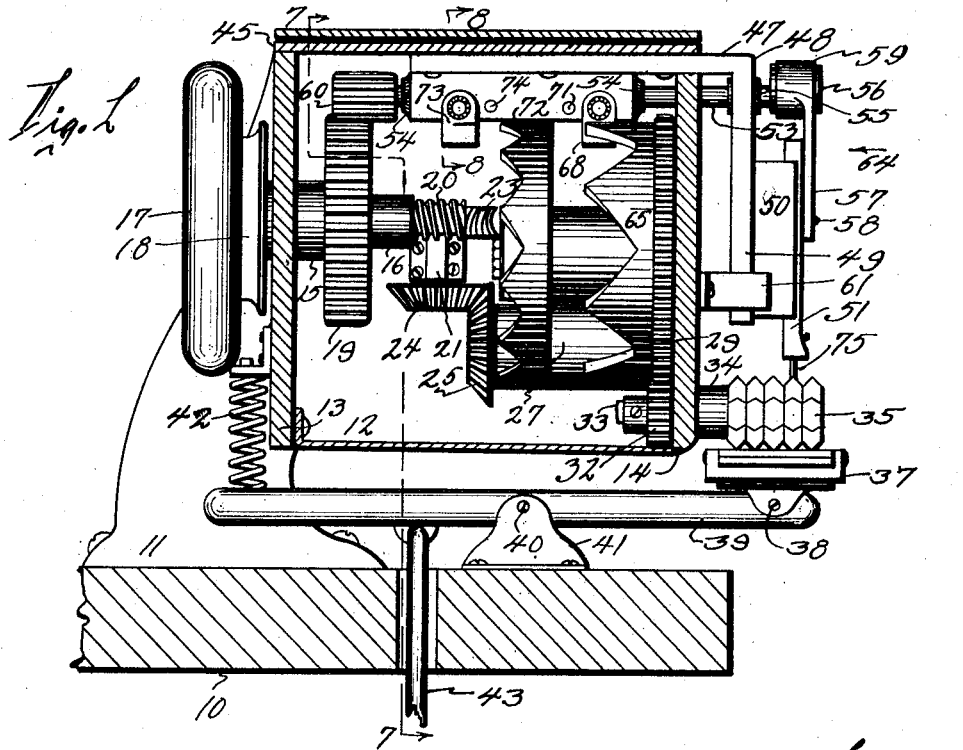
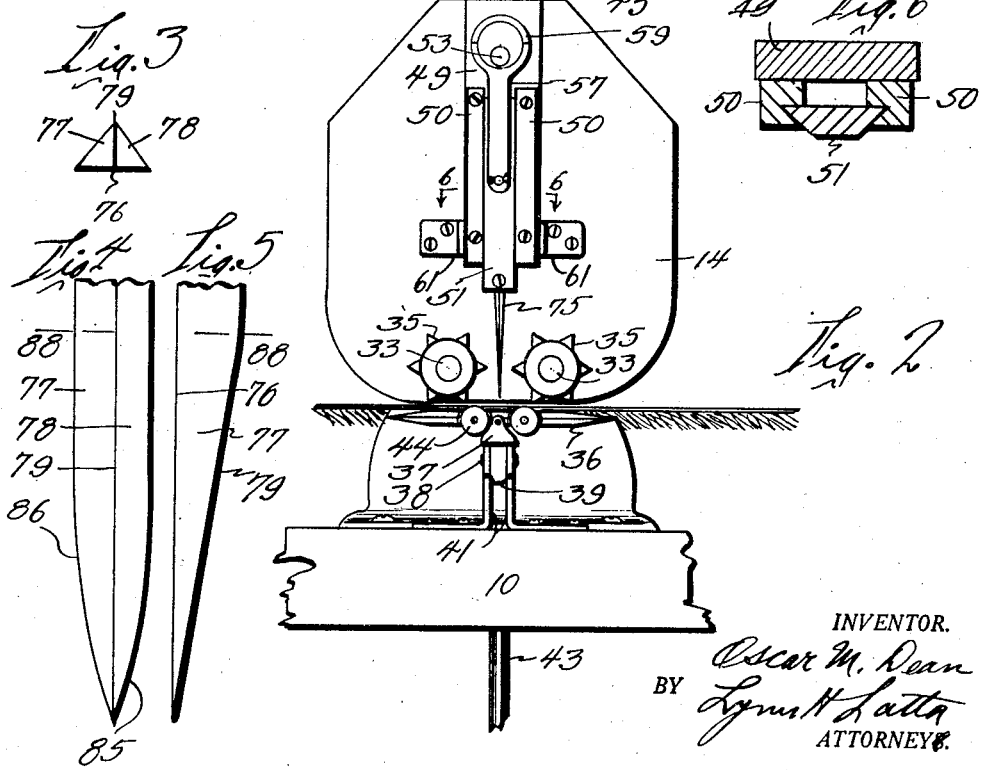

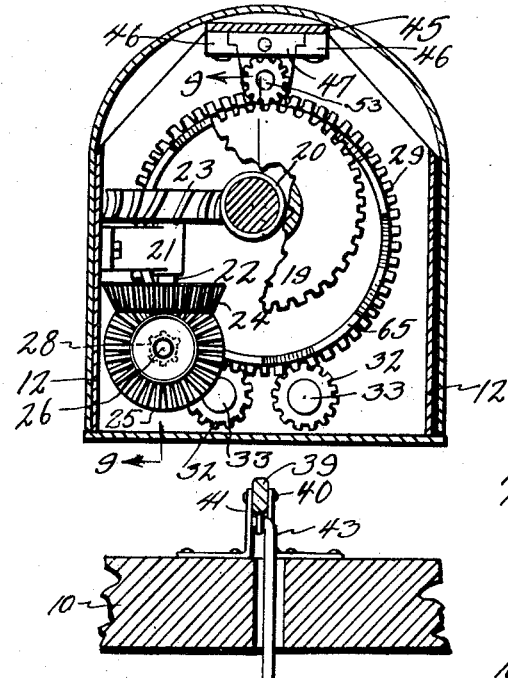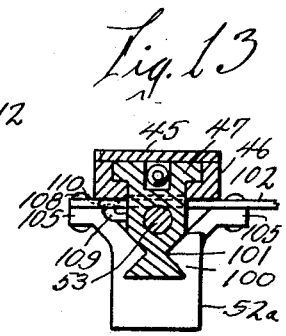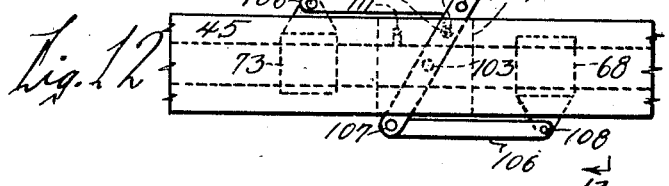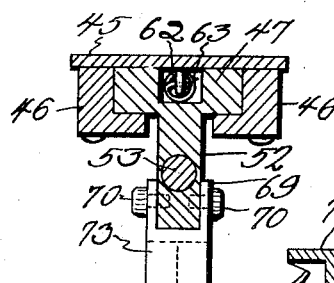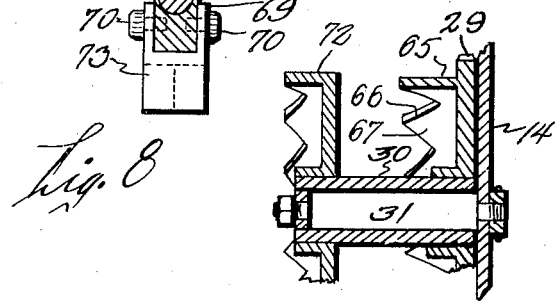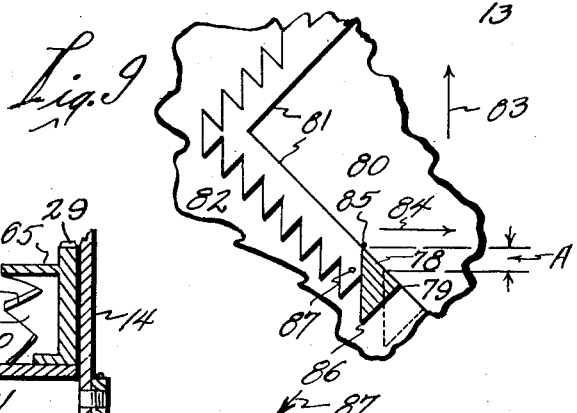

Jan. 24, 1933.  O. M. DEAN  1,895,025
PROCESS OF CUTTING FUR
Filed Oct. 22, 1930   3 Sheets-Sheet 3
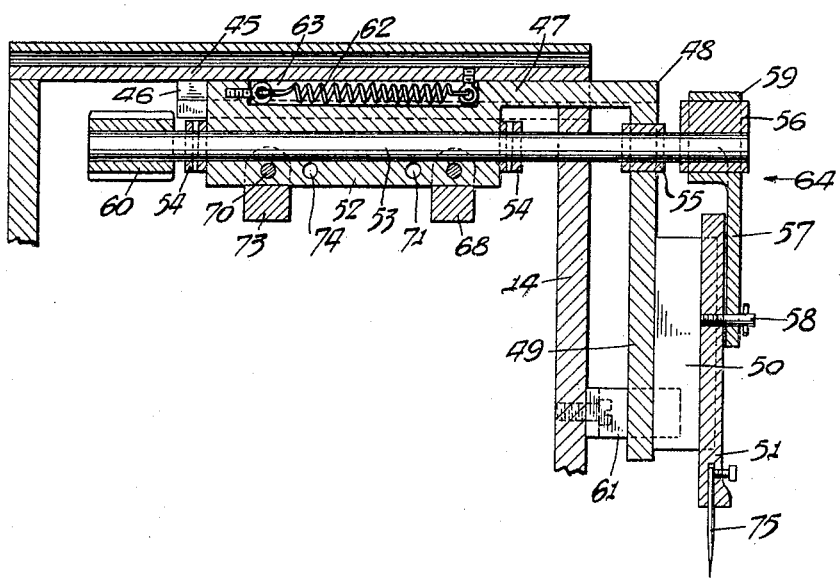
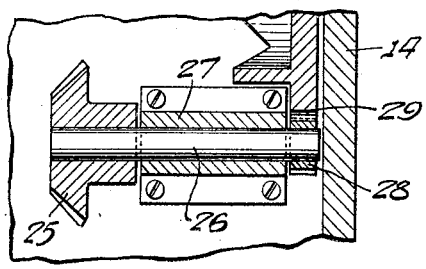
Inventor
Oscar M. Dean
By Lynn H. Latta
Attorney Patented Jan. 24, 1933

1,895,025

REISSUED

UNITED STATES PATENT OFFICE

OSCAR M. DEAN, OF SIOUX CITY, IOWA

PROCESS OF CUTTING FUR

Application filed October 22, 1930. Serial No. 490,485.

My invention relates to the art of notching the edges of furs which are to be sewed together. It has been learned in the fur garment industry that the line of stitching between two skins may be fairly well concealed by providing the edges of the skins with registering notches and sewing the skins together along the edges of these notches. The notches are tri-angular in shape and preferably formed with edges disposed at 90° to each other.

The object of the present invention is to provide a machine by means of which these notches can be rapidly and very accurately cut in the furs. At the present time it is considered necessary to cut these notches by hand, and furriers have acquired considerable skill in the use of a fur knife. The inaccuracy, however, which is characteristic of the human hand, makes it practically impossible to ever obtain a perfect match in the notches of skins thus cut, when sewed together. My invention provides a machine which obtains this accuracy.

Another object of my invention is to provide a machine which is of comparatively simple, durable, and inexpensive construction.

A further object is to provide a machine which is very rapid in operation and which will make a continuous cut to produce the notches.

The most important requirement in notching furs, next to the accuracy of the notches, is that the cutting shall be done without clipping any of the hairs of the fur. It can be readily seen, if scissors or any sort of shearing device were to be used, that the hairs which lay over the line of cut would be clipped and shortened. When the furs were sewed together, these shortened hairs would very definitely mark the seam between the skins. This has been avoided in the past by the skill of the hand operator in cutting the fur from the side opposite the hairs. However, it constitutes a real problem when the cutting of the furs by machinery is contemplated. This problem has undoubtedly been the obstacle which has so far stood in the path of the machine cutting of furs.

My invention overcomes this problem by the use of a reciprocating needle which pierces the skin at right angles to the surface thereof and cuts a very short portion of the line of cut during a single piercing operation. This is the basic feature of my invention.

An object of my invention is to provide a machine embodying the needle principle of cutting, in which the skin may be continuously fed against the needle without buckling or clogging.

Another object of my invention is to provide an arrangement in which the notching effect is obtained by the combined translatory movement of the needle in a direction at right angles to its axis of reciprocation and the movement of the skin in a direction at right angles both to the direction of reciprocation of the needle and the direction of translatory movement of the needle.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a longitudinal, sectional view through the machine of my invention,

Fig. 2 is a front elevation of the machine,

Fig. 3 is an inverted, plan view of the cutting needle,

Fig. 4 is a front elevation of the same,

Fig. 5 is a left, side elevation of the same,

Fig. 6 is a horizontal, sectional view taken on the line 6—6 of Fig. 2,

Fig. 7 is a vertical, sectional view taken on the line 7—7 of Fig. 1,

Fig. 8 is a detail, sectional view taken on the line 8—8 of Fig. 1,

Fig. 9 is a detail, diagrammatic view illustrating the relative movements of the needle and skin during the cutting operation, Fig. 10 is a detail, sectional view through the axis of the cams which produce translatory movement of the needle, Fig. 11 is an inverted, plan view of one of the cam followers, Fig. 12 is a plan view of a modified form of the carriage, and Fig. 13 is a transverse, sectional view taken on the line 13—13 of Fig. 12.

Fig. 14 is a longitudinal sectional view through the needle carriage.

Fig. 15 is a longitudinal sectional view through the transmission shaft assembly.

The machine comprises a base 10 which supports a bracket 11 on which the cutting head is mounted. The cutting head has a box or frame including the side walls 12, the rear wall 13, and the front wall 14. In a suitable bearing 15 on the rear wall 13 is mounted a shaft 16 at the outer end of which is secured a combined fly-wheel 17 and pulley 18. Within the cutter head frame, a gear 19 is secured to the shaft 16 and a worm 20 is formed on or secured to the end of the shaft.

Journalled in a bearing 21 secured to a side wall 12 is a shaft 22 to the upper end of which is secured a worm wheel 23 meshing with the worm 20. To the lower end of the shaft 22 is secured a bevel gear 24 which meshes with the bevel gear 25, mounted on a transmission shaft 26.

The shaft 26 is journalled in the bearing 27 secured to the side wall 12, and to its other end is secured a pinion 28.

The pinion 28 meshes with a spur gear 29 mounted on a sleeve 30, which in turn is journalled on the stud 31 secured in the front wall 14.

Meshing with the spur gear 29 are a pair of pinions 32, secured to the shaft 33, journalled in bearings 34 on the front wall 14. To the outer ends of the shafts 33, are secured knurled feed rollers 35.

Co-acting with the rollers 35, is a work supporting plate 36 mounted in a yoke 37 which is pivoted as at 38 upon a swinging lever 39. The lever 39 is fulcrumed at 40 in a bracket 41 secured to the base 10. A compression spring 42 urges the rear end of the lever downwardly, thus urging the work supporting plate upwardly toward the feed rollers 35. Upward pressure from a suitable foot lever (not shown) delivered by a push rod 43, serves to open the jaws of the machine, moving the work support 36 downwardly to allow a skin to be inserted between the support and the rollers 35.

Rollers 44 may be mounted in the work support 36 to facilitate the movement of the skins below the rollers 35.

A bridge bar 45 connects the upper ends of the walls 13 and 14, and secured to the bridge bar 45 are a pair of guides 46 which slidably support the horizontal slide member 47 of the needle carriage 48. The needle carriage includes a vertical, depending arm 49, to which is secured a pair of guides 50 between which is slidably mounted the needle chuck 51.

The horizontal arm 47 of the needle carriage has a central depending rib 52 and a needle reciprocating shaft 53 extends longitudinally through the rib 52 and is journalled therein. Collars 54 secured to the needle shaft prevent longitudinal movement of the shaft relative to the carriage. The shaft 53 extends also through the arm 49 and is journalled in a bushing 55 therein. Upon the outer end of the shaft is secured an eccentric cam 56. A pitman 57 is pivoted at 58 to the needle chuck 51 and has the eccentric ring 59 which encircles the cam 56.

On the opposite end of the shaft 53 is secured a pinion 60 which meshes with the drive gear 19. The pinion 60 is long enough so that as the needle carriage moves longitudinally of the machine, the pinion will remain in mesh with the gear 19, the teeth of the pinion sliding relative to the teeth of the gear.

A pair of guides 61 secured to the forward wall 14 retain the lower end of the depending arm 49 of the needle carriage against lateral movement as the carriage moves longitudinally.

A pull-spring 62 is secured at its forward end to the carriage 47 and at its rear end to the bridge bar 45. The pull-spring 62 lies in a groove 63 in the arm 47 of the needle carriage. The pull of the spring tends to move the carriage rearwardly, in the direction indicated by the arrow 64 in Fig. 14.

In order to move the carriage forwardly, I provide a crown cam 65, which may be formed as a part of the gear 29 or secured to the sleeve 30, and which rotates in unison with the gear. The helical faces 66 of the teeth 67 of the crown cam engage against a cam follower 68, secured to the rib 52 of the needle carriage. The follower 68 in horizontal cross-section is tri-angular shaped as shown in Fig. 11. The upper extremity of the follower is formed with a pair of arms 69 (Fig. 8) which embrace the rib 52 and are secured thereto by thumb screws 70 extending therethrough and into the rib 52.

The object of thus securing the follower is to provide for adjustment. By securing the follower to the threaded holes 71, it is positioned out of engagement with the crown cam 65. An auxiliary crown cam 72, having a greater number of teeth than the cam 65, co-acts with an auxiliary follower 73 shaped to fit the cam 72, the follower 73 being shown positioned out of engagement. It may be positioned in engagement with its cam by securing it to the threaded holes 74 in the same manner as the other follower.

The machine is thus selective for two different sizes of notches, since the size of a notch depends upon the relative number of reciprocations of the needle carriage compared with the speed of travel of the work. Since the latter is constant, variation of the former will produce a variation in the size of the notch. The small cam is used for Hudson seal and the larger for Northern seal.

The follower blocks may be controlled by a lever as shown in Figs. 12 and 13, wherein the blocks are formed with ears shaped as at 100 in Fig. 13, and slidably mounted in grooves 101 in the depending rib 52—a of the carriage.

A lever 102 is pivoted at 103 in a slot 104 in the rib 52—a, is connected to a pair of ears 105 on the follower blocks 68 and 73, respectively by a pair of links 106, pivoted at 107 and 108 to the ears 105 and lever 102 respectively.

A pin 109 mounted in the rib 52—a, engages an opening 110 in the lever 102 to hold the lever in the position shown in Fig. 12, wherein the follower blocks are positioned so that the carriage is actuated by the secondary cam 72.

A pin 111, similar to the pin 109, engages the opening 110 to secure the lever in a reverse position wherein the follower blocks are spread apart to bring the forward follower block into engagement with the primary cam 65. The ends of the pin 109 and 110 are rounded to allow the lever 102 to spring past them.

The needle 75 is shown in detail in Figs. 3, to 5, inclusive. In horizontal cross-section, it is triangular as shown in Fig. 3. The rear face of the needle, which is parallel to and adjacent the wall 14, is perfectly straight and vertical as indicated at 76 in Fig. 5.

The two faces, 77 and 78, of the needle are equal in area and width, and, at the lower end of the needle, converge until the corner 79 formed by their intersection merges with the face 76 to form the point of the needle.

The faces 77 and 78 are so inclined relative to each other that the angle formed between them, in a horizontal cross-section of the needle, is equal to the angle between the sides of the cut to be produced in the work. This cut is shown in Fig. 9, wherein the work is indicated by the reference character 80, and the edges of the cut by the reference character 81. The waste material which is trimmed from the edge of the skin is indicated at 82.

Assuming that the work is being fed between the plate 36 and the rollers 35 in the direction indicated by the arrow 83, while the needle, shown in cross-section of Fig. 9, is traveling in the direction indicated by the arrow 84, it will be seen that the face 78 of the needle will be exactly parallel to the edge of the cut 81. The smooth edge of the cut is made by the sharp edge 85 of the needle while the needle is moving in the direction of the arrow 84, and the cut which is made by the edge 86 of the needle extends into the waste material.

The translatory movement of the needle is produced by the cam 65 or 72 and the spring 62, both acting against the horizontal arm 47 of the needle carriage to slide the arm in the slides 46. The arm 49 of the needle carriage slides between the guide brackets 61 and carries with it the needle reciprocating mechanism including the chuck 51 and the eccentric mechanism 56 to 59. The cam 65 moves the carriage in the direction 64 and spring 62 returns the carriage in an opposite direction.

As the carriage slides in and out, the pinion 60 will slide relative to the gear 19 without losing its mesh therewith.

The gear 29 is substantially the same in diameter as the cams 65 and 72, and consequently the circumferential speed of the gear will be transmitted to the rollers 35, which are substantially the same in diameter as the pinion 32, at such a rate that the circumferential speed of the rollers 35 will be substantially that of the cam 65. Thus the work will travel through the machine in exact step with the cam.

The motion of the needle will be quite rapid compared to the motion of the carriage and rollers 35, and this difference in speeds is obtained by employing the worm 20 to step down the speed to the carriage reciprocating mechanism and advancing rollers and by employing the gear 19 to step up the speed to the needle. By mounting both worm 20 and gear 19 on the same shaft, a constant ratio between the respective speeds of the carriage control mechanism and needle drive mechanism is assured.

The present invention accomplishes the machine cutting of fur by piercing the same transversely of its plane with a series of narrow cuts, progressively arranged in the fur along the desired line of cut, the necessary relative movement of translation between the fur and the piercing device being slow as compared with the piercing movement.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. The method of cutting a fur bearing hide which comprises repeatedly piercing the hide progressively along the desired line of cut, the individual cuts being relatively narrow, and made between the hairs.

2. The method of notching a fur bearing hide which comprises repeatedly piercing the hide progressively along the desired line of cut, the individual cuts being relatively narrow, and made between the hairs.

3. The method of notching a fur bearing hide which comprises repeatedly piercing the hide from the flesh side progressively along the desired line of cut, the individual punctures being relatively narrow, and made between the hairs.

4. The method of cutting fur bearing hide which comprises repeatedly piercing the hide between the hairs thereof, and shifting the relative positions of the hide and piercing means so as to arrange the punctures progressively along the line of cut.

Signed at Sioux City, Iowa, this 18 day of October, 1930.

OSCAR M. DEAN.